W. Patterson,
Clothes Pin,
№ 64,698. Patented May 14, 1867.
Fig; 1.
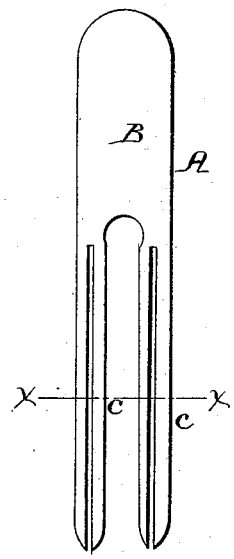
Fig; 2.
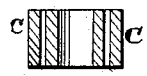
Witnesses,
Inventor;

United States Patent Office.

WILLIAM PATTERSON, OF LOWELL, MASSACHUSETTS, ASSIGNOR TO GEORGE T. COMINS, OF SAME PLACE.

*Letters Patent No. 64,698, dated May 14, 1867.*

IMPROVEMENT IN CLOTHES-PINS.

The Schedule referred to in these Letters Patent and making part of the same.

TO ALL WHOM IT MAY CONCERN:

Be it known that I, WILLIAM PATTERSON, of the city of Lowell, and county of Middlesex, State of Massachusetts, have invented a new and improved "Clothes-Pin;" and I do hereby declare that the following is a full, clear, and exact description thereof, which will enable others skilled in the art to make and use the same, reference being had to the accompanying drawing, forming part of this specification.

The present invention relates to the ordinary clothes-pin formed of a block or piece of wood, with two parallel prongs or arms; and it consists in splitting each of the said prongs, for their entire length or nearly so, across their width, thus forming a double-armed prong of each of the usual prongs, whereby the flexibility of the prongs is much increased without detracting from their strength or weakening them in the least degree, as will be obvious from the following detailed description thereof, reference being had to the accompanying plate of drawings, in which—

Figure 1 is a side elevation of a clothes-pin made according to the present improvements.

Figure 2, a transverse section of the same taken in the plane of the line $x\ x$, fig. 1.

A, in the drawings, represents a clothes-pin of the ordinary form, with its body or main or solid portion B provided with two parallel prongs or arms C C of the requisite length, which prongs are split into two prongs across their width and for their length, or nearly so, as plainly shown in the drawing, by means of which their flexibility is greatly increased, while at the same time their strength is not materially if at all lessened, as is obvious without further explanation, the importance of which is self-evident to all without any particular mention herein.

What I claim as new, and desire to secure by Letters Patent, is—

The arrangement of the split teeth C C in combination with the body B, constructed and operating in the manner herein represented and described.

The above specification of my invention signed by me this      day of      , 1866.

WM. PATTERSON.

Witnesses:
 WM. C. FRENCH,
 JOEL POWERS.